Sept. 19, 1944.   A. A. CAMPBELL   2,358,315
TRANSFER MECHANISM
Filed July 3, 1941
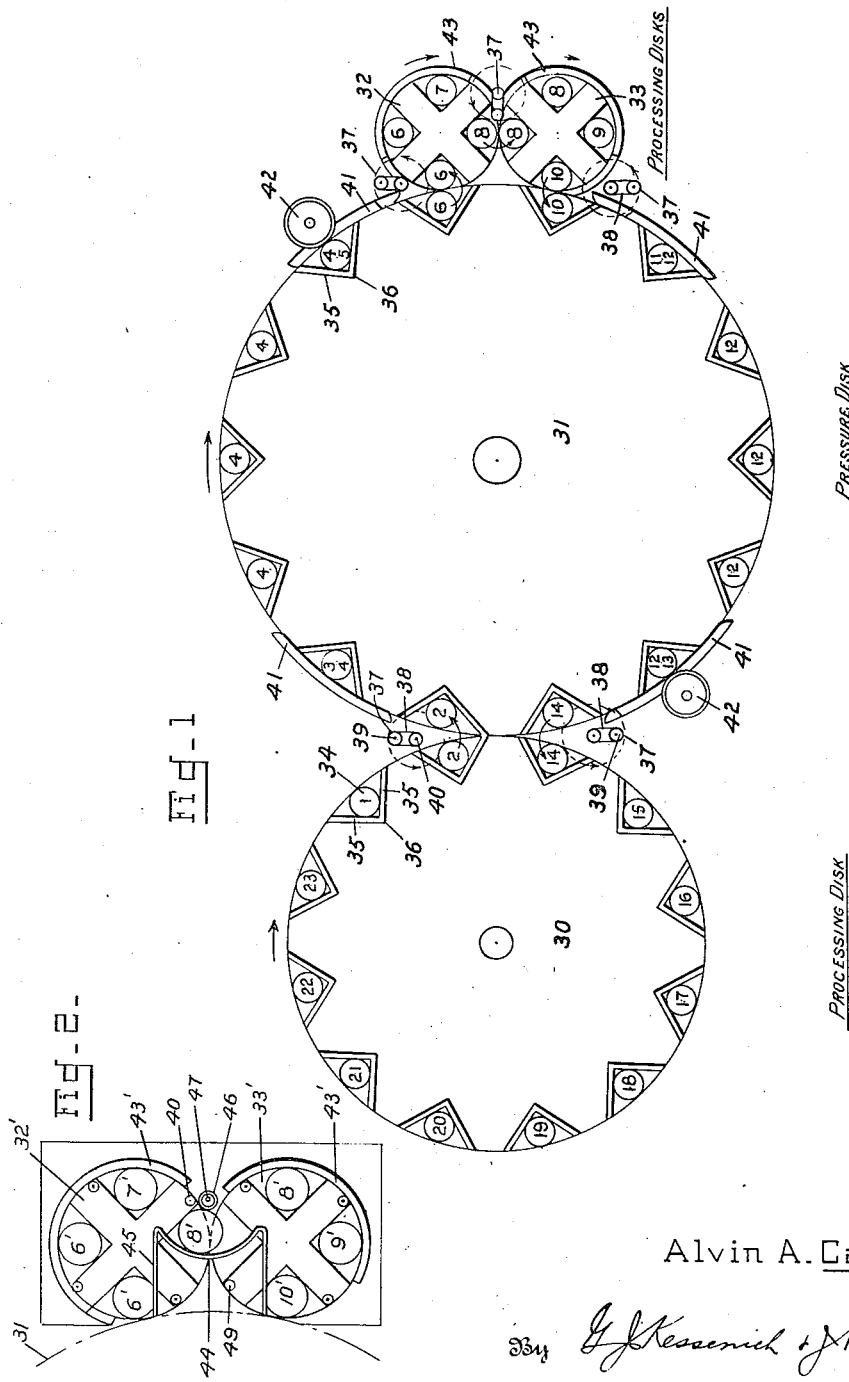
Inventor
Alvin A. Campbell Patented Sept. 19, 1944

2,358,315

UNITED STATES PATENT OFFICE 2,358,315

TRANSFER MECHANISM

Alvin A. Campbell, Hackettstown, N. J.

Application July 3, 1941, Serial No. 400,984

5 Claims. (Cl. 198—22)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to transfer mechanisms and more particularly to a mechanism for transferring cylindrical bodies from one processing station to another.

In the loading of shells, indexing mechanisms having straight line movements are often employed. In the rather swift movement of the containers between progressive processing stations, jerking results from rapid acceleration and deceleration. This represents wasted motive energy and reduces the life of the machinery through excessive wear.

An object of the invention is to provide a comparatively high speed transfer mechanism for a container loading and processing machine which is smooth and economical in operation, simple in construction, strong and durable.

Another object of the invention is to provide a mechanism which will permit a longer pressure treatment of shells which are being loaded by a machine without retarding the total output.

A further object of the invention is to provide a conveyor arrangement which will enable a machine for progressive loading to occupy a minimum of floor space.

The specific nature of the invention as well as other objects and advantages thereof will clearly appear from a description of a preferred embodiment as shown in the accompanying drawing in which:

Figure 1 represents a diagrammatic plan view of a practical embodiment of a transfer mechanism for use in conjunction with a shell loading machine, and Figure 2 is a plan view of a modified deflecting device and associated transfer mechanism.

Referring now to the drawing, the transfer mechanism comprises four coplanar rotary disks 30, 31, 32, and 33 of varying diameters. The disks are driven so as to rotate at the same peripheral velocity. Disk 30 is positioned in a tangential relation to disk 31. The rotors 32 and 33 are mounted with their circumferences tangential to each other and to the periphery of disk 31.

Each disk is provided with spaced holders or work stations which are numbered from 1–23 in accordance with the operation performed on a shell 34. One type of holder is a compartment with angular confining walls 35 coming to an apex 36 which is directed toward the axis of rotation of the disk. Disk 31 is larger in diameter than rotor 30 for a purpose which will be explained later. The work stations on rotors 30, 31, 32 and 33 are spaced equidistantly about their respective circumferences. Arcuate retaining walls 43 keep the containers on rotors 32 and 33 until they come within the influence of the deflectors 37 at the transfer zones.

Deflectors 37, which may be in the form of rotary crank arms 38, are equipped with rollers 39 on the outer ends and rotate counterclockwise about vertical axes 40. The deflectors 37 sweep or slide a shell or carrier 34 from a work station on one disk to a corresponding work station on an adjoining disk.

The operation of the transfer mechanism is as follows: The container 34 is inserted in an idle station or holder 23 on the processing disk 30. This disk may be indexed clockwise about its axis but preferably has constant rotation. At station 1 pellets are dropped into the container and the latter advances clockwise to station 2. During the movement toward station 2, the container is engaged by the deflector 37 and is shifted laterally to station 2 on pressure disk 31 which is rotating in a clockwise direction. The container 34 is engaged by guide bar 41 at station 3—4 to index it into alignment with a conventional compacting ram of a pellet compressing device (not shown). Pressure is applied and sustained as the container rotates by the stations which are numbered 4. At work station 4—5 index bar 41 urges the container 34 against the walls 35. Wheel 42 which has a resilient facing on its periphery grips the outer surface of the container and holds it down on the disk 31 while the compacting punch is withdrawn. At 6 the container is deflected to processing rotor 32 whereupon it advances to station 7 where additional pellets are inserted. The container is then transferred to rotor 33 at 8 by one of the aforementioned deflectors 37. At station 9 starting powder is inserted and the shell moves on to position 10 where it is shifted to the large pressure disk 31. At station 11—12 the shell is again indexed by the bar 41 and pressure is applied to the charge and sustained until it reaches station 12—13. Here it is indexed as previously described and the punch is withdrawn while the disk 42 holds the shell 34 on the rotor 31. At 14 the shell is pushed on to the processing rotor 30 by the deflector 37. The shell advances to positions 15 and 16 where gaging operations are performed on the material in the shell to determine the accuracy of the fill. When the container advances to 17 a steel washer is dropped on the charge. At 18 a Celluloid disk is inserted and at 19 another washer is inserted. At station 20 the shell casing is given a preliminary 45° crimp and at 21 the shell end is crimped flat. When the container reaches station 22 it is removed and an empty fixture is inserted at 23 and it starts on its cycle.

Fig. 2 illustrates a modified arrangement for transferring bodies from one disk to the other. This mechanism is particularly adapted for use in conjunction with processing disks such as 32—33 in Fig. 1.

A container is received at station or holder 6' on a disk 32' which is rotating in a clockwise direction. Arcuate confining walls 43' retain the container on the disk 32' as it rotates about its axis. At station 7' a processing operation takes place and it is then carried to the deflecting station 8'. Here the container engages the curved wall 44 of a fixed deflector 45 which is positioned over the rotating disks 32' and 33' near the point of tangency. The container rolls or slides along the arcuate wall 44 toward station 8' on the disk 33'. Centrifugal force acts on the container in this region since it is no longer confined by the retaining wall 43' and assists in moving of the container to disk 33'. A guide preferably in the form of a roller 46 on a fixed vertical axis 47 directs the container or work piece to station 8' on disk 33'. When a portion of the container lodges on the clockwise rotating disk 33', a pulling influence is exerted on the container and this further assists in making the transfer. A pusher or roller 40 mounted near the periphery of the disk 32' gives the container a final thrust on to the work station 8' of disk 33'. Roller 49, similarly mounted on disk 33' assists in retaining the carrier in the station 8' on that disk. The container is given additional processing on disk 33' until it arrives at transfer station 10' where it is shifted to another disk by one of the aforementioned deflectors.

The employment of a plurality of coordinated transfer disks has the several advantages over a single large disk as well as over a conveyor having a straight line movement. A saving in valuable floor area results and a smoothness in operation is accomplished. It is to be noted that disk 31 is the largest disk. Because of the longer duration of travel of a workpiece on that disk as compared with its stay on a smaller disk, it is ideal for the application of sustained pressure. This dwell feature permits the required pressure for compacting purposes to be applied over more prolonged intervals and yet retains speedy operating conditions at the work stations on the smaller disks. This appreciably increases the output of the shell filling machine.

While the invention has been described with respect to a shell loading machine, it will be understood that the embodiment herein disclosed is merely illustrative of the invention and one application thereof, the invention being limited only by the scope of the following claims.

I claim:

1. A transfer mechanism of the character described comprising a plurality of disks mounted in the same plane and tangentially to each other and adapted for rotation in opposite directions at the same peripheral velocity, said disks being provided with equally spaced work holding pockets opening toward the periphery of the disks, said pockets being formed with upstanding walls, the two adjoining walls of two successive pockets on one disk forming, adjacent the point of tangency, substantially a continuation of the corresponding walls of the two successive pockets on the other disk, and rotary transfer means adjacent the point of tangency of the disks for transferring the work from one disk to the other.

2. A transfer mechanism of the character described designed to transfer containers from one locality and return said containers to the same locality, comprising a plurality of disks of different diameters mounted in the same plane and tangential to each other and adapted for rotation in opposite directions at the same peripheral velocities at the point of tangency, and disks being provided at their peripheries with equally spaced container pockets opening toward the peripheries of said disks, said pockets being formed with upstanding angularly related walls, two adjoining walls of two successive pockets on one disk forming, adjacent the point of tangency, substantially a continuation of two successive walls of the adjoining pockets on the other disk to form a barrier against movement of the container in one direction at the point of transfer from one disk to the other, stationary arcuate guide members on the larger disk positioned adjacent the point of tangency of the disks to guide the containers upon leaving and upon returning to the smaller disk, and rotary transfer means adjacent the point of tangency of the disks for transferring the containers from one disk to the other.

3. The invention of claim 2 characterized in that the container pockets are substantially triangular, the apex of the triangle being radial to the center of rotation of the disk to accurately position the container in said pockets.

4. A transfer mechanism of the character described, comprising a circular disk having equally spaced container pockets adjacent its periphery opening toward said periphery, two smaller circular equal size disks mounted in the same plane and tangential to each other and to the larger disk, all of the disks mounted for rotation in different directions at their points of tangency, container pockets in one smaller disk for receiving a container, at the point of tangency, from the larger disk, similar pockets in the other smaller disk for receiving the containers from the other smaller disk and delivering them to the pockets of the larger disk, means adjacent the points of tangency of all the disks for deflecting the containers from one disk to another, and guide means partially surrounding the smaller disks and terminating short of the points of tangency of the disks.

5. The invention of claim 4 characterized in that there is a guide roller adjacent the point of tangency between the smaller disks, a fixed deflector overlying said smaller disks, and pusher pins carried by the disks and cooperating with the guide roller to guide the container from one smaller disk to the other.

ALVIN A. CAMPBELL.